United States Patent [19]

Hunt et al.

[11] Patent Number: 5,165,903
[45] Date of Patent: Nov. 24, 1992

[54] INTEGRATED PROCESS AND APPARATUS FOR CONTROL OF POLLUTANTS IN COAL-FIRED BOILERS

[75] Inventors: Terry G. Hunt, Aurora, Colo.; George R. Offen, Woodside, Calif.

[73] Assignee: Public Service Company of Colorado, Denver, Colo.

[21] Appl. No.: 796,909

[22] Filed: Nov. 22, 1991

Related U.S. Application Data

[63] Continuation of Ser. No. 509,629, Apr. 16, 1990, abandoned.

[51] Int. Cl.$^5$ .................... B01J 8/00; C01B 17/00; C01B 21/00
[52] U.S. Cl. .................... 423/239; 423/235; 423/244.07
[58] Field of Search .................... 423/235, 235 D, 239, 423/239 A, 244 A, 244 R

[56] References Cited

U.S. PATENT DOCUMENTS

| | | | |
|---|---|---|---|
| 3,900,554 | 8/1975 | Lyon | 423/235 |
| 4,208,386 | 6/1980 | Arand et al. | 423/235 |
| 4,423,017 | 12/1983 | Dean | 423/235 |
| 4,507,269 | 3/1985 | Dean et al. | 423/235 |
| 4,636,370 | 1/1987 | Dean et al. | 423/235 |
| 4,767,605 | 8/1988 | Lindbauer et al. | 423/239 |
| 4,777,024 | 10/1988 | Epperly et al. | 423/235 |
| 4,780,289 | 10/1988 | Epperly et al. | 423/235 |
| 4,793,981 | 12/1988 | Doyle et al. | 423/239 |
| 4,839,147 | 6/1989 | Lindbauer et al. | 423/235 |
| 4,844,915 | 7/1989 | Hooper | 423/235 |
| 4,851,201 | 7/1989 | Heap et al. | 423/235 |

*Primary Examiner*—Gregory A. Heller
*Attorney, Agent, or Firm*—John E. Reilly

[57] ABSTRACT

A method and apparatus for reducing $SO_x$ and $NO_x$ levels in flue gases generated by the combustion of coal in a boiler in which low $NO_x$ burners and air staging ports are utilized to inhibit the amount of $NO_x$ initially produced in the combustion of the coal, a selected concentration of urea is introduced downstream of the combustion zone after the temperature has been reduced to the range of 1300° F. to 2000° F., and a sodium-based reagent is introduced into the flue gas stream after further reducing the temperature of the stream to the range of 200° F. to 900° F. Under certain conditions, calcium injection may be employed along with humidification of the flue gas stream for selective reduction of the pollutants.

13 Claims, 3 Drawing Sheets

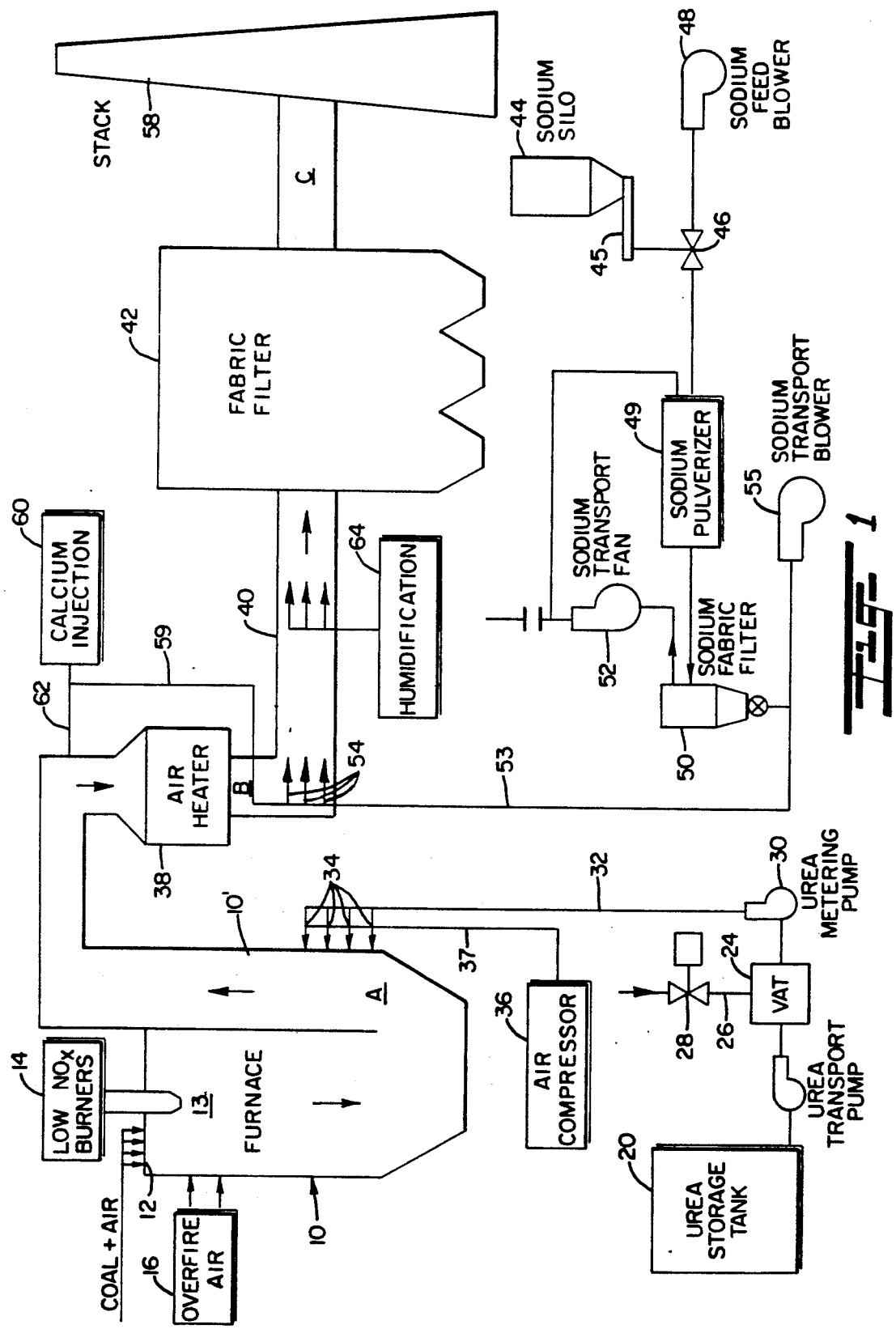

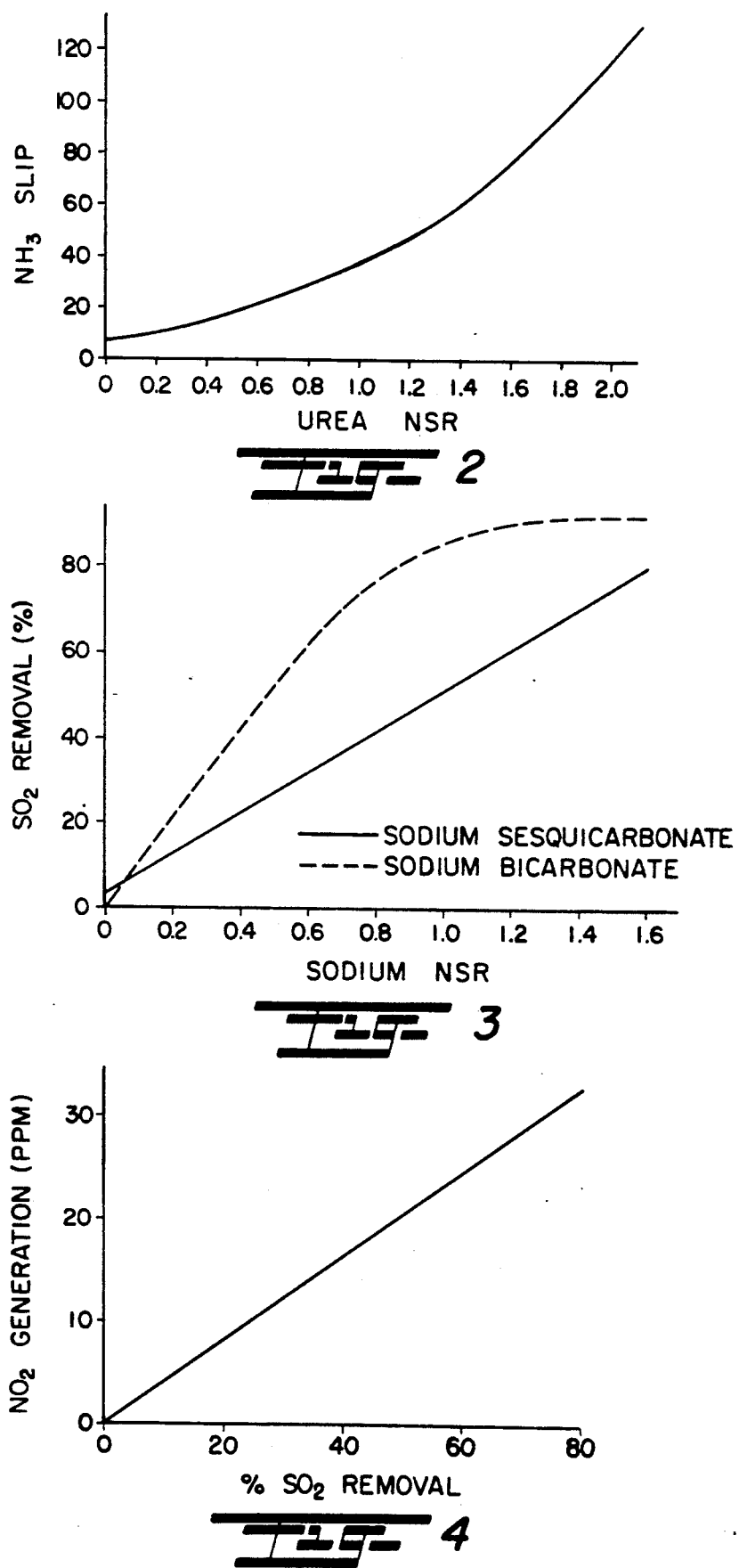

INTEGRATED PROCESS AND APPARATUS FOR CONTROL OF POLLUTANTS IN COAL-FIRED BOILERS

The Government of the United States of America has rights in this invention pursuant to Contract No. DE-FC22-91PC90550, awarded by the U.S. Department of Energy.

This application is a continuation application of Ser. No. 509,629, filed Apr. 16, 1990, for INTEGRATED PROCESS AND APPARATUS FOR CONTROL OF POLLUTANTS IN COAL-FIRED BOILERS, invented by T. G. Hunt et al., now abandoned.

SPECIFICATION

This invention relates to the reduction of pollutants generated by the combustion of coal; and more particularly relates to a novel and improved method and apparatus for reducing nitrogen oxide (NO), nitrogen dioxide ($NO_2$) and sulfur dioxide ($SO_2$) emissions in the combustion effluent of coal-fired boilers.

BACKGROUND AND FIELD OF THE INVENTION

A number of processes have been proposed for the reduction of $NO_x$ and $SO_x$ generated by the combustion of coal in a boiler. Essentially, those processes that have been devised in the past are satisfactory for reducing either of the $NO_x$ and $SO_x$ compounds but not for the reduction of both.

It has been proposed to condition the combustion process so as to reduce the amount of $NO_x$ formed. New burners are commercially available that modify the method of mixing in the fuel to achieve 20% to 50% $NO_x$ reduction. In another method, selective catalytic reduction (SCR) reduces $NO_x$ after it has formed by reacting with ammonia ($NH_3$) in the presence of a catalyst to reduce NO to $N_2$ and water. The SCR method is capable of achieving up to 90% $NO_x$ removal. In selective noncatalytic reduction (SNR), either $NH_3$ or urea is injected into the boiler at high temperatures to reduce $NO_x$ to $N_2$ and water without a catalyst. Representative patents which disclose the SNR method discussed above is U.S. Pat. No. 4,208,386 to Arand et al and U.S. Pat. No. 4,636,370 to Dean et al. Again, while the processes referred to above have been employed for many years to reduce $NO_x$, certain problems have been encountered. For example, combustion modification is relatively inexpensive but is limited in the amount of reduction that can be realized. SCR also has been successful, to some degree, but the catalyst employed often becomes contaminated with $SO_x$ and requires replacement after as little as two years of use. Certain catalysts are classed as hazardous waste materials and thus the process is expensive both to install and operate. Furthermore, SNR has been more successful when used for the removal of $NO_x$ in gas turbines and other low $NO_x$ units but has definite limitations when used in the reduction of $NO_x$ in coal-fired boilers and especially those employed at electrical power stations.

Both the SCR and SNR processes have demonstrated a tendency to generate new pollutants during the $NO_x$ removal reaction. On account of the inefficiency of the reaction, some ammonia can be generated and is emitted with the other combustion effluent. In U.S. Pat. No. 4,780,289 to Epperly et al, a method is disclosed for the reduction of ammonia ($NH_3$) emissions by controlling the reaction temperature very carefully and asserts that it is possible to reduce $NH_3$ from 50 ppm to below 10 ppm; however, close constant control is required to regulate the process parameters in maintaining $NH_3$ emissions. In U.S. Pat. No. 4,777,024 to Epperly et al, it is proposed to inject a second treatment agent to limit ammonia ($NH_3$) emissions. Various chemicals, such as, oxygenated hydrocarbons, amino acids, proteins and methyl compounds are proposed for use as the second treatment agent. It is asserted that it is possible to realize up to 80% $NO_x$ reduction with ammonia slips of 21 ppm but again requires extremely close control over the urea injection process and amount of treatment agents to limit the amount of ammonia emissions.

Other systems have been proposed for the removal of $SO_2$ pollutants. Wet limestone scrubbers have been employed on high sulfur coal with reductions of $SO_2$ up to 90% being claimed. It has also been proposed to inject limestone into the boiler to reduce the amount of $SO_2$ pollutants. To the present time, these technologies largely have been proposed for use independently of the reduction of $NO_x$. When sodium injection has been employed in the past, it has offered the potential for high $SO_2$ removal in relation to installed costs; however, in the process of converting the $SO_2$ gas to sodium sulfate which is a solid collected with the fly ash, a portion of the NO is converted to $NO_2$ and in sufficient quantities can result in the emission of a visible plume from the stack of the boiler.

U.S. Pat. No. 4,844,915 to Hooper discloses a process wherein urea and a sodium reagent are intermixed, injected simultaneously and maintained in contact with the flue gas for a time period sufficient to react the sodium reagent with at least some of the $SO_x$ and $NO_x$ to increase both the percentage $SO_x$ and $NO_x$ removal while suppressing the conversion of NO to $NO_2$. Lacking in Hooper is a recognition of the amount of ammonia slip produced as a result of the urea injection and the fact that there is no change in NO removal as a result of the addition of urea. Broadly, from the technologies evaluated in this field, there continues to be a significant problem in achieving high $NO_x$ removal without high ammonia ($NH_3$) emissions or in obtaining high $SO_2$ removal without creating a visible $NO_2$ plume. It is therefore proposed in accordance with the present invention to achieve substantial reductions of $NO_x$ and $SO_x$ and specifically to substantially reduce the formation of $NO_2$ to a level which will avoid formation of a visible brown plume.

SUMMARY OF THE INVENTION

Accordingly, it is an object of the present invention to provide for a novel and improved method and apparatus for the reduction of pollutants emitted into the atmosphere from a coal-fired boiler.

Another object of the present invention is to provide for a novel and improved method and apparatus for the reduction of $NO_x$ and $SO_x$ generated as a result of the combustion of coal and specifically in such a way as to substantially reduce the emission of $NO_2$ into the atmosphere.

A further object of the present invention is to achieve up to 70% reduction of $NO_x$ and $SO_x$ pollutants from a flue gas stream of a coal-fired boiler at low capital cost along with reduction of other pollutants.

It is a further object of the present invention to provide for a novel and improved apparatus for the reduction of pollutants formed in a coal-fired boiler through the sequential introduction of urea and sodium based reagents at spaced locations in the boiler system; and further wherein the urea and sodium-based reagent injection are employed in combination with burners and air staging ports capable of reducing the initial production of $NO_x$ in the combustion zone of the boiler.

An additional object of the present invention is to provide a method and apparatus for controlling the pollutants produced by a coal-fired boiler and avoiding formation of a visible brown plume wherein the quantity of $NO_x$ produced from combustion of coal is inhibited as a preliminary to sequential reaction with a urea solution and a sodium-based reagent.

In accordance with the present invention, a method has been devised for reducing $SO_x$ and $NO_x$ levels in flue gases generated by the combustion of coal in a boiler by the steps of introducing air into the first zone of said boiler to produce an oxygen-rich environment injecting urea into the first zone of the boiler adjacent to the combustion zone in which the flue gas temperature is in the range of 1300° F. to 2000° F., and injecting a sodium-based reagent into the flue gas stream downstream of the urea injection in a second zone and at a point at which the temperature of the flue gas stream is in the range of 200° F. to 900° F. Preferably, the urea is injected in the ratio of 0.1 to 5.0 moles per mole of $NO_x$ and in sufficient quantities to produce ammonia; and the sodium reagent is injected in the ratio of 0.1 to 5.0 moles of sodium per mole of $SO_2$ present in the flue gas stream, the sorbent being injected in sufficient quantities to remove $SO_2$ and chemically react with the ammonia in the flue gas stream and reduce the production of $NO_2$ whereby to prevent the formation of a visible brown plume when the flue gas stream is emitted into the atmosphere. As a preliminary step to the injection of urea into the flue gas stream, a combustion zone is created in which the level of $NO_x$ produced by the combustion of coal is reduced by more than 50% by the use of low $NO_x$ burners and air staging ports. The process lends itself well to utilization of sodium injection or calcium injection followed by humidifying the flue gas stream to cooperate with the reagent injected to increase the percentage of $SO_2$ removal from the stream, the calcium injected at a temperature range of 200° F. to 1100° F. In a filtering step, any solid particles are removed from the flue gas stream as a preliminary to emission from the stack of the boiler into the atmosphere.

In the apparatus of the present invention, a coal-fired boiler has been devised for the reduction of pollutants from the flue gases generated from the combustion of coal in the boiler prior to emission into the atmosphere in which the improvement comprises a combustion zone including a plurality of low $NO_x$ burners, means for introducing air into the combustion zone and heat exchange means for recovering steam from the boiler as well as for heating the air passing into the combustion zone, urea injecting means including a source of urea in solution, and means for injecting the urea under pressure into the path of the flue gas stream from the combustion zone, the urea injecting means being at a location at which the flue gases are at a temperature level in excess of 1300° F. to 2000° F., reagent injecting means for injecting a sodium-based reagent into the path of the flue gas stream downstream of the urea injection means and at a location at which the temperature level of the flue gases is reduced below 900° F. and filtering means for removing any solid particles from the flue gases downstream of the reagent injection means preliminary to discharge of the gases into the atmosphere.

As suitable alternatives, calcium based reagents may be introduced in place of or in combination with the sodium reagent at a location at which the temperature level is reduced below 1100° F.; and humidification means may be utilized to cooperate with the reagent in the removal of $SO_2$ from the flue gas stream.

The above and other objects, advantages and features of the present invention will become more readily appreciated and understood from a consideration of the following detailed description of a preferred embodiment of the present invention when taken together with the accompanying drawings of a preferred embodiment of the present invention, in which:

BRIEF DESCRIPTION OF THE DRAWINGS

FIG. 1 is a flow diagram of a preferred form of apparatus in accordance with the present invention;

FIG. 2 is a graph illustrating the amount of ammonia slip produced in relation to the amount of urea injected in a conventional selective non-catalytic reduction process (SNR);

FIG. 3 is a graph illustrating percentage $SO_2$ removal as a result of dry sodium injection;

FIG. 4 illustrates the change in $NO_2$ versus percentage $SO_2$ removed in accordance with conventional practice;

DETAILED DESCRIPTION OF THE PREFERRED EMBODIMENT

Figure 5:
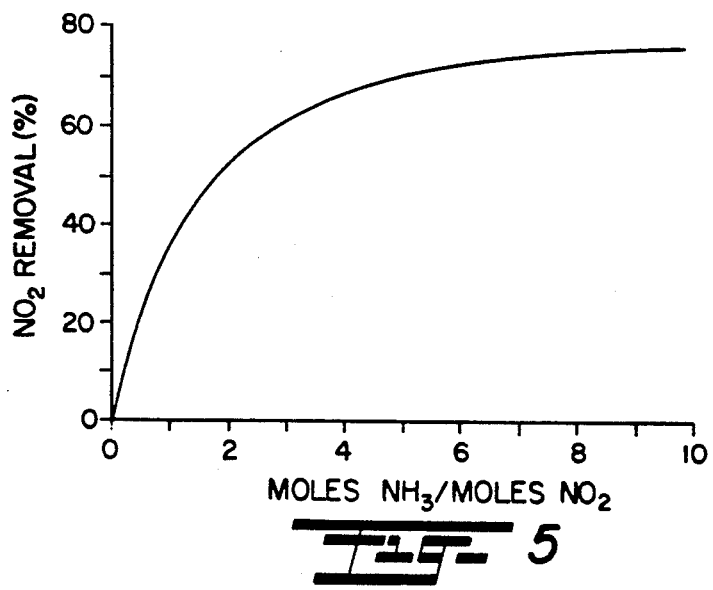
FIG. 5 illustrates the percentage $NO_2$ removal in accordance with the present invention.

Referring in more detail to the drawings, the present invention may be best typified by describing its use and application to a coal-fired boiler 10 as represented in FIG. 1 and, for instance, may be a top-fired boiler of the type employed in a 100 MW steam electric generating station. In accordance with well-known practice, a pulverized coal is introduced along with primary air at an inlet 12 into a combustion zone 13. The boiler is modified by incorporating low $NO_x$ burners 14, such as, Model XCL burners manufactured and sold by Babcock and Wilcox of New Orleans, La. The burners are arranged in a pattern four wide and three deep in the roof to direct secondary air into the combustion zone 13 and provide for intermixture with the coal and primary air. Although not shown, a burner control system in association with the burners includes appropriate lighters with scanners, built-in pitot tubes to measure burner air flow and thermocouples to measure burner metal temperatures in order to set cooling air requirements.

The air staging ports 16 are arranged in banks on each side of the boiler to inject overfire air in the ratio of 0% to 25% of the total secondary air into the combustion zone 13. Each port 16 is equipped with an adjustable vane to control any swirl in the outer injector zone as well as the flow to the inner zone for optimum penetration. A pitot tube grid is built in to indicate air flow at each port and actual airflow may be measured upstream of the ports by separate air measuring devices, not shown.

Preferably, the boiler is a vertically fired boiler and, as previously indicated, the utilization of the XCL burners 14 alone can result in the reduction of $NO_x$ emissions up to 50%. Further, the use of air staging ports 16 in combination with the XCL burners 14 can result in greater $NO_x$ reductions of up to 70%. The $NO_x$ is formed during the combustion of fossil fuels by several mechanisms: At flame temperatures in excess of 2800° F. significant quantities of so-called thermal $NO_x$ are formed by dissociation and oxidation of nitrogen with the combustion air. Thermal $NO_x$ is the primary cause of $NO_x$ from firing natural gas and light oil, and a significant contributor with coal. "Fuel $NO_x$" refers to emissions which result from oxidation of nitrogen which is bonded to the fuel molecules and which becomes actively involved in the combustion process as the hydrocarbon chains are broken and oxidized, and a portion of the nitrogen is oxidized as a result.

The supplemental reduction of nitrogen oxide in the flue gas stream is accomplished by spraying an aqueous solution of the urea into the boiler combustion gases, hereinafter referred to as the "flue gas stream", downstream of the combustion zone itself. As illustrated in FIG. 1, a source of urea supply is indicated at 20 and is drawn by means of a transport pump 22 into a mixing vat 24 where it is combined with water supplied through line 26 which contains a control valve 28. The rate of introduction of the urea into the boiler is regulated by a metering pump 30 in the inlet line 32 leading to a series of spray nozzles 34 in the side of the boiler. Air under pressure is delivered by air compressor 36 via line 37 into the spray nozzles to encourage intimate and rapid mixing of the urea solution with the flue gas stream. The overall reaction is as follows:

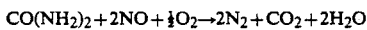

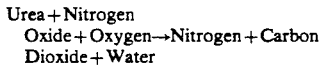

Urea + Nitrogen
 Oxide + Oxygen→Nitrogen + Carbon
 Dioxide + Water

The urea injection reaction is preferably at a point downstream of the combustion zone where the temperature level of the flue gas stream is in the range of 1300° F. to 2000° F., the optimum range being between 1700° F. and 1900° F. At lower temperatures, side reactions can occur resulting in the undesirable formation of ammonia, whereas at higher temperatures the reactions tend to produce additional NO. The key process variables for optimum reduction of $NO_x$ are the urea-to-NO mole ratio, initial NO concentration, urea concentration in solution and the degree or extent of atomization of the urea when injected with the air into the boiler. If desired, other well known reducing agents may be introduced with the urea, such as, methanol.

The urea-to-NO molar ratio is the most important process variable and, for instance, a side effect of a high urea-to-NO ratio is an increase in ammonia ($NH_3$) by-product as illustrated in FIG. 2. The urea concentration in the solution has a direct effect on the extent of NO reduction, since at higher urea concentrations it will affect the point at which the reaction begins due to the length of time required to evaporate the water in solution prior to pyrolysis. Similarly, injection atomizer characteristics have an impact upon urea utilization and consequently the $NO_x$ reduction. It is therefore desirable to achieve greater penetration of the urea solution into the combustion chamber and more thorough mixing with the flue gas stream.

The flue gas stream advances from the combustion zone through the first urea treatment zone and past various heat exchange sections in the convection section 10' and which are utilized to recover useful energy in the form of steam from the hot flue gases. The flue gases then advance through an air heater 38 and a second reagent treatment zone in a duct 40 between the air heater section 38 and a fabric filter unit 42. In the treatment zone at location B, a dry pulverized mixture of a sodium-based compound is injected into the duct 40, the sodium being delivered from a silo 44 through a screw feeder 45 and an eductor 46 and then transported with air under pressure from blower 48 into a pulverizer 49. The pulverizer 49 grinds the sodium to a particle size substantially the same as the existing coal ash size and advances the sodium with the aid of another blower 52 into the filter 50. The sodium particles are then removed from the filter 50 and discharged via line 53 through a set of injection nozzles 54 by blower 55. Various sodium-based reagents may be used in the process depending upon the site. Sodium bicarbonate provides the highest efficiency at injection temperatures 300° F. and higher. Sodium sesquicarbonate provides lower but acceptable efficiency but can be more efficient at temperatures below 300° F.

The flue gas stream flowing through the duct 40 contains any NO not removed by the urea injection system together with ammonia slip ($NH_3$) as a product of reaction between the urea and $NO_x$. The sodium reagent may be injected either upstream or downstream of the air heater section 38 but preferably at a point where the temperature level of the flue gas stream is consistently below 900° F. It is believed that a chemical reaction occurs between the sodium and $SO_2$ which converts the $SO_2$ to sodium sulfate along with the conversion of NO to $NO_2$; and that a portion of the $NO_2$ then combines with the sodium to form sodium nitrate and combines with the ammonia to form ammonium nitrate. A small portion of the ammonia as well as the nitrogen oxides that does not react is emitted from the boiler stack 58; and the sulfates and nitrates are removed by the fabric filter 42 and may be disposed of as solid wastes in an appropriate land fill. In accordance with the present invention, the ammonia slip that is produced as a result of urea injection will reduce the amount of NO converted to $NO_2$ by integrating the injection of sodium downstream of the urea and at a location where the $NO_2$ that is produced will most effectively undergo a chemical reaction with any ammonia present in the flue gas stream.

Dry, granular calcium particles may be prepared and injected into the ductwork 40 in the same manner as described with respect to the sodium-based reagent, and the calcium injection system as represented at 60 may communicate through line 59 with the injection nozzles 54 for the sodium-based reagent. In the alternative, the calcium reagent can be injected at selected points upstream of the air heater section 38 as designated at 62 for the purpose of reacting with $SO_2$ to form calcium sulfates and sulfites.

A preferred calcium reagent is hydrated lime. A humidification stage as represented at 64 can be utilized to increase the efficiency of removal of $SO_2$. Flue gas conditioning by humidification essentially comprises injecting water into the flue gas stream downstream of the air heater 38 and upstream of any particulate control device, such as, the filter 42. Subsequent evaporation causes the flue gas stream to cool thereby decreasing its volumetric flow rate and increasing its absolute humidity. The presence of water in the flue gas containing unreacted sorbent, such as, hydrated lime also provides for additional SO$_2$ capture. From a performance standpoint, SO$_2$ capture is related to the amount of water that is injected up to the adiabatic saturation temperature point. From an operational standpoint, it is important that the water be introduced in such a way as to prevent wall wetting or deposition and assure complete evaporation before the gas enters the fabric filter. It is therefore desirable that the water be atomized and evenly distributed into the flue gas stream and can be accomplished, for example, through the utilization of dual fluid atomizers which are capable of producing a very fine spray. The production of ammonia slip as a result of the injection of urea downstream of the combustion zone minimizes the problem of reentrainment in electrostatic precipitators due to extremely low fly ash resistance when humidifying down to within 10° F. to 20° F of saturation temperature. In other words, the ammonia slip will increase the stickiness of the fly ash and overcome the reentrainment problem by avoiding the production of dust in the precipitator.

The following Examples are given by way of illustration and not limitation with respect to specific equipment or flue gas conditions, since the invention may be successfully applied to all major coal-fired boiler types and for many different pollutant concentrations. In the following, the coal used is a low sulfur subbituminous coal, although the process is readily conformable for use with virtually any type of coal; also, the process may be adapted for use with different air heaters, such as, a regenerative heater and also various particulate control devices in place of the fabric filter 42, such as, an electrostatic precipitator. Again, FIG. 1 is representative of a 100 MW steam electric generating station employed in carrying out the processes disclosed in Examples 1, 2 and 3.

EXAMPLE 1

The composition of the combustion products and other characteristics of the flue gas stream as measured at locations A, B and C of FIG. 1 is set forth in Table I below. For purposes of testing in EXAMPLE 1, the apparatus of FIG. 1 was modified to the extent that conventional multi-tip vertical intertube burners were used in place of the burners 14 and without the introduction of overfire air through the ports 16.

TABLE I

| | | | | Flue Gas Composition - Example 1 | | | | | |
|---|---|---|---|---|---|---|---|---|---|
| Location | H$_2$O % | CO$_2$ % | N$_2$ % | O$_2$ % | SO$_2$ ppm | NH$_3$ ppm | NO ppm | NO$_2$ ppm | Temp F. | Flue Gas Vol. SCFM |
| A | 9.3 | 13.9 | 73.3 | 3.5 | 420 | 0 | 920 | 10 | 1820 | 243,600 |
| B | 8.6 | 12.7 | 73.7 | 4.9 | 420 | 30 | 368 | 10 | 300 | 266,112 |
| C | 8.6 | 12.7 | 73.7 | 4.9 | 118 | 9 | 326 | 26 | 290 | 266,112 |

The temperature at location A is from 1420° F. to 1820° F. depending upon unit load. At full load of 100 MW the temperature is 1820° F. The preferred flue gas temperature will depend significantly on the boiler type which determines NO$_x$ concentration and coal type which determines SO$_2$ concentration but are in the range of 1400° F. to 1900° F. As the SO$_2$ concentration increases and the sodium injection rate increases the injection temperature is decreased. At location A, a liquid solution of 30% urea to 70% water is injected into the combustion products in a manner that will provide fast and effective urea distribution and atomization. The preferred urea/water concentration may be adjusted from 10% to 60% depending on the flue gas temperature at the point of injection. The concentration preferably is such that at the time the water has vaporized and the urea reaction with the NO in the flue gas stream begins, the urea is in the preferred temperature range of 1400° F. to 1900° F. Thus at high temperatures the urea/water concentration should be decreased while at low temperature urea concentration should be increased.

The preferred amount of urea to be injected varies significantly depending on initial NO concentration and desired NO removal. Normalized Stoichiometric Ratio (NSR) may be defined as the ratio of the actual molar ratio to the stoichiometric ratio. Theoretically ½ mole of urea must be injected to remove 1 mole of NO, and thus the NSR for urea may be shown as:

$$NSR = \frac{\text{moles urea/moles NO}}{1/2} = 2 \text{ moles urea/mole NO}$$

In actual practice, urea is injected at a rate to provide an NSR of 0.8 and is sufficient for approximately 60% NO removal at a temperature of 1830° F. The main variables determining correct NSR and hence injection rate for an installation are the desired NO removal rate and injection temperature. After injection of the urea solution a chemical reaction occurs that converts a portion of the NO into N$_2$ and water.

After injection, the total NO in the flue gas has been significantly reduced. Flue gas concentrations for this example are shown at location B in Table I. Table I shows that NO has been reduced by 60%. Other gas concentrations are essentially unchanged although free ammonia has increased. FIG. 2 is a graph of ammonia slip vs. urea NSR.

The flue gas stream passes through the air heater 38 and duct 40 where the temperature is substantially reduced. At this point a mixture of air and sodium sesquicarbonate is injected such that an even distribution of reagent occurs throughout the flue gas. The amount of air used to carry the sodium will depend largely on the method of reagent preparation. The sodium reagent is pulverized, its mass mean diameter (MMD) being such that it can be removed with the fly ash.

For sodium reagents the rate of injection is dependent upon the baseline SO$_2$ and the desired removal rate. Two moles of sodium are required to remove one mole of SO$_2$, and thus NSR may be defined as:

$$NSR = \frac{\text{moles sodium/moles SO}_2}{2} = \frac{\text{moles sodium}}{2(\text{moles SO}_2)}$$

Data on required NSR for various $SO_2$ removals was obtained by injecting sodium bicarbonate and sodium sesquicarbonate downstream of the air heater where the flue gas temperature is from 200° F. to 900° F. A fabric filter was used for particulate capture.

As shown in FIG. 3, sodium sequicarbonate would be injected at an NSR of 1.4 to obtain 70% removal. At the point of injection a chemical reaction occurs that converts the $SO_2$ in the flue gas into sodium sulfate. In addition a reaction occurs that converts some of the NO in the combustion products into $NO_2$. Some of this $NO_2$ is removed as sodium nitrate but the net $NO_2$ emissions from the stack are increased. Generally, the amount of $NO_2$ conversion will depend on the rate of $SO_2$ removal.

Data on the amount of $NO_2$ increase for various $SO_2$ removals was obtained by injecting sodium sesquicarbonate as described above. The data is presented in FIG. 4 for a low sulfur coal and shows that as $SO_2$ removal increases, $NO_2$ stack emissions will increase if sodium injection is completed without concurrent urea boiler injection. At this value a brown/orange plume would be visible from the stack. FIG. 5 presents data collected on a coal-fired boiler that was operating with sodium injections with concurrent ammonia injection. As one mole of ammonia is required to remove one mole of $NO_2$, the NSR for $NO_2$ removal may be defined as:

NSR=1 mole $NH_3$/1 mole $NO_2$

From the data approximately 40% of the $NO_2$ would be removed and would be sufficient to avoid the occurrence of a visible $NO_2$ plume.

Figure 6:
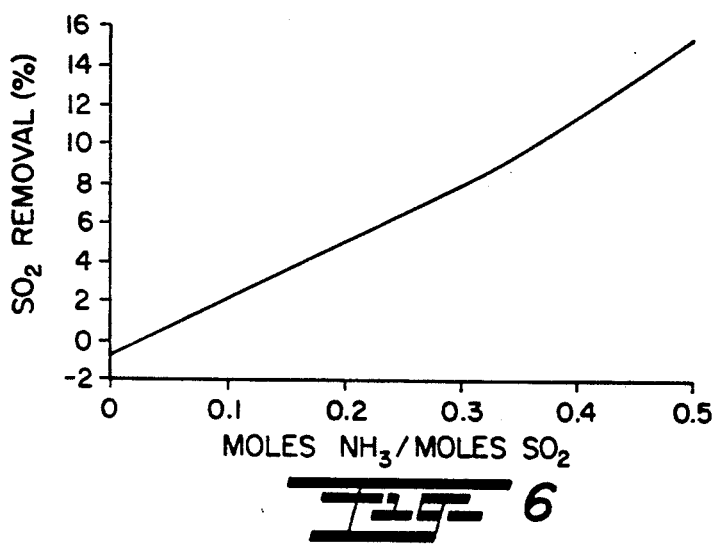
FIG. 6 illustrates the amount of $SO_2$ removed for different given ratios of moles $NH_3$ to $SO_2$ in accordance with the present invention.

In addition to $NO_2$ removal from the ammonia, an increase in $SO_2$ removal will also occur. The data is presented in FIG. 6 which shows that in this example an additional 2% $SO_2$ removal will occur and ammonia concentration will be reduced due to $SO_2$ removal.

Figure 7:
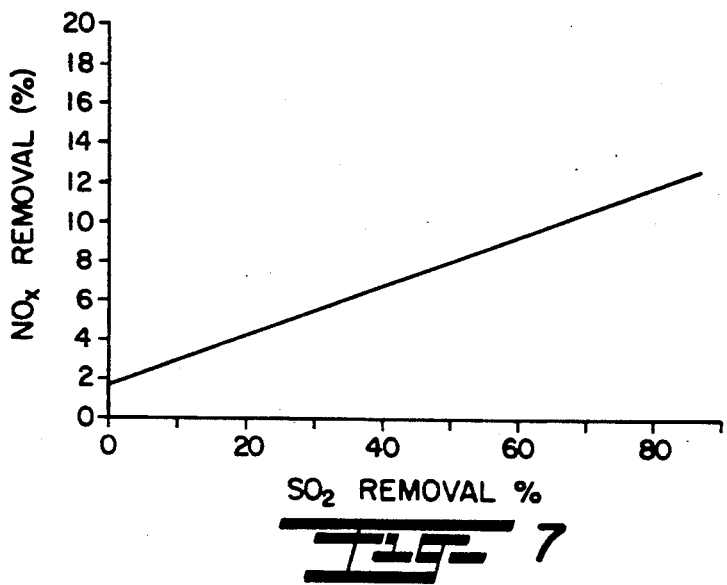
FIG. 7 illustrates the percentage removal of $NO_x$ to $SO_2$ by conventional sodium injection.

In addition to the $SO_2$ removal that occurs with the injection of sodium compounds, some NO removal occurs. This occurs by conversion of NO to $NO_2$ and subsequent removal of the $NO_2$ as sodium nitrate. Data on the amount of $NO_x$ removal is shown in FIG. 7. In this example an additional 11% $NO_x$ removal would occur at the 70% $SO_2$ removal rate.

The final concentrations of major constituents of the combustion products are shown in Table I at location C which illustrates that 62% $NO_x$ and 72% $SO_2$ removals would be achieved.

EXAMPLE 2

The invention is applied to the same boiler system as Example 1 with the boiler operating at the 40 MW level and using the conventional multi-tip burners and without introduction of air through the air staging ports 16. At a point upstream of the urea injection zone, the flue gas is composed of the constituents listed in Table II at location A.

TABLE II

| | Flue Gas Composition - Example 2 | | | | | | | | | |
|---|---|---|---|---|---|---|---|---|---|---|
| Location | $H_2O$ % | $CO_2$ % | $N_2$ % | $O_2$ % | $SO_2$ ppm | $NH_3$ ppm | NO ppm | $NO_2$ ppm | Temp F. | Flue Gas SCFM |
| A | 8.8 | 13.1 | 73.6 | 4.5 | 420 | 0 | 620 | 8 | 1420 | 112,300 |
| B | 8.2 | 12.0 | 73.9 | 5.8 | 420 | 36 | 248 | 8 | 280 | 122,700 |
| C | 8.2 | 12.0 | 73.9 | 5.8 | 135 | 15 | 221 | 22 | 270 | 122,700 |

Where the temperature at the point of injection is 1420° F., the urea concentration is raised to 60% so that the net temperature at the point of water vaporization is approximately the same as Example 1. Urea is injected at an NSR of 1.0.

Table II at location B shows the flue gas composition downstream of the air heater. The NO concentration has been reduced 60% and ammonia has increased as detailed in FIG. 2. Other constituents have not changed significantly.

Sodium sesquicarbonate is injected at an NSR of 1.3 such that 66% $SO_2$ removal is obtained as shown in FIG. 3. The rate of injection will increase the $NO_2$, if sodium is injected without concurrent urea boiler injection as shown in FIG. 4. At this ammonia slip level, 36% of $NO_2$ is removed as in FIG. 5 at an ammonia NSR of 1.0. The free ammonia would also react with the $SO_2$, and 2% $SO_2$ removal would occur with a corresponding reduction in ammonia. In addition the sodium system would remove 11% of the total $NO_x$, as shown in FIG. 7, for a low sulfur coal.

The final flue gas composition at the stack is listed in Table II at location C. As shown, 61% $NO_x$ removal and 68% $SO_2$ removal would occur.

EXAMPLE 3

In this Example, the preferred form of low $NO_x$ downfired burners 14 and air staging ports 16, as shown in FIG. 1, were utilized for purposes of comparison with Example 1. Table III illustrates the flue gas composition when measured at locations A, B and C.

TABLE III

| | Flue Gas Composition - Example 3 | | | | | | | | | |
|---|---|---|---|---|---|---|---|---|---|---|
| Location | $H_2O$ % | $CO_2$ % | $N_2$ % | $O_2$ % | $SO_2$ ppm | $NH_3$ ppm | NO ppm | $NO_2$ ppm | Temp F. | Gas SCFM |
| A | 9.3 | 13.9 | 73.3 | 3.5 | 420 | 0 | 368 | 10 | 1820 | 243,600 |
| B | 8.6 | 12.7 | 73.7 | 4.9 | 420 | 30 | 184 | 10 | 300 | 266,112 |
| C | 8.6 | 12.7 | 73.7 | 4.9 | 118 | 9 | 163 | 26 | 290 | 266,112 |

It will be seen from a comparison with Table I that a 60% reduction in the NO generated is achieved in the combustion zone and still further reduction by virtue of the injection of urea and sodium as described.

In a corresponding manner, utilization of the preferred form of burners 14 and air staging ports 16 in Example 2 will result in corresponding reduction of NO to 372 ppm at location A, 186 ppm at location B and 166 ppm at location C. Accordingly, a marked reduction in NO generation is realized through the combined utilization of low $NO_x$ burners and air staging ports, followed by sequential introduction of the urea and sodium reagents.

As employed throughout, reference to sodium sesquicarbonate and sodium bicarbonate is intended to refer either to processed or naturally occurring sodium compounds, such as, trona and nacholite. It is therefore to be understood that while a preferred method and apparatus have been set forth herein various modifications and changes may be made without departing from the spirit and scope of the present invention as defined by the appended claims.

We claim:

1. The method of removing $SO_x$ and $NO_x$ from the flue gas stream of a coal-fired boiler comprising the steps of:
   (a) introducing air into a first zone of said boiler to produce an oxygen-rich environment;
   (b) injecting a solution of urea into said first zone of said boiler at which the temperature of the flue gas stream is in the range of 1300° F. to 2000° F., said solution of urea being injected in the ratio of 0.1 to 5.0 moles per mole of $NO_x$ and in sufficient quantity to produce ammonia; and
   (c) injecting a sodium-based sorbent into said flue gas stream at a location spaced from and downstream of the injection of urea in step (b) above after the temperature of the flue gas stream has dropped to less than 900° F., said sorbent injected in the ratio of from 0.1 to 5.0 moles of sodium per mold of $SO_2$ present in the flue gas stream, and said sorbent injected in sufficient quantities to remove $SO_2$ and chemically react with the ammonia in the flue gas stream and reduce the production of $NO_2$ whereby to prevent the formation of a visible brown plume when the flue gas stream is emitted into the atmosphere.

2. The method according to claim 1, including the step of injecting said sorbent as a dry, granular material in a fluid carrier.

3. The method according to claim 1, including the step of pulverizing said sorbent and emitting the flue gas stream into the atmosphere after filtering out solid particles therefrom.

4. The method according to claim 1, said sorbent selected from the group consisting of sodium sesquicarbonate, and sodium bicarbonate.

5. The method according to claim 1, including the step of filtering out solid particles from the flue gas stream downstream of the point of sorbent injection.

6. The method according to claim 1, including the step of injecting a reducing agent with said urea in step (b).

7. The method according to claim 1, the concentration of urea in solution being in the range of 10% to 60%.

8. The method of removing $SO_x$ and $NO_x$ from the flue gas stream of a coal-fired boiler comprising the steps of:
   (a) producing an oxygen-rich environment in the combustion zone of said boiler;
   (b) injecting a liquid solution of urea into said combustion zone of said boiler at which the temperature of the flue gas stream is in the range of 1300° F. to 2000° F., the concentration of urea in solution being in the range of 10% to 60% and being present in sufficient quantities for conversion of nitrogen oxide to nitrogen and water as well as to result in the formation of ammonia; and
   (c) injecting a sorbent selected from sodium and calcium compounds into said flue gas stream at a location spaced from and downstream of the injection of urea in step (b) above after the temperature of the flue gas stream has dropped into the range of 200° F. to 900° F. for sodium and 200° F. to 1100° F. for calcium, said sorbent injected in sufficient quantities to most effectively undergo a chemical reaction with any ammonia present in the flue gas stream whereby to reduce the production of $NO_2$ and prevent the formation of a visible brown plume when the flue gas stream is emitted into the atmosphere.

9. The method according to claim 8, including the step of injecting a reducing agent with said urea in step (b).

10. The method according to claim 8, said sorbent selected from the group consisting of sodium sesquicarbonate and sodium bicarbonate.

11. The method according to claim 8, including the step of injecting said sorbent in dry powder form with a mean particle diameter corresponding to the diameter of the coal ash.

12. The method according to claim 8, including the step of filtering solid particles in a filtering device having an air-to-cloth ratio from 1.5 to 6.0.

13. The method according to claim 12, including the step of emitting the flue gas stream into the atmosphere after filtering out solid particles therefrom.

* * * * *